United States Patent [19]

Uchino et al.

[11] Patent Number: 4,794,316
[45] Date of Patent: Dec. 27, 1988

[54] INDUCTION MACHINE SYSTEM

[75] Inventors: Hiroshi Uchino; Takeo Shimamura, both of Hachioji, Japan

[73] Assignee: Kabushiki Kaisha Toshiba, Kawasaki, Japan

[21] Appl. No.: 71,139

[22] Filed: Jul. 8, 1987

[30] Foreign Application Priority Data

Jul. 11, 1986 [JP] Japan .................... 61-163458

[51] Int. Cl.$^4$ ............................. H02P 9/00
[52] U.S. Cl. ........................... 322/47; 322/24
[58] Field of Search ............... 322/47, 32, 24

[56] References Cited

FOREIGN PATENT DOCUMENTS 57-59497 4/1982 Japan ........................... 322/47

OTHER PUBLICATIONS

West Germany: Bundesministerium fuer Forschung und Technologie, BMFT-FB-T 84-154(1), Jul. 1984, pp.92-98.

Primary Examiner—R. J. Hickey
Attorney, Agent, or Firm—Foley & Lardner, Schwartz, Jeffery Schwaab, Mack, Blumenthal & Evans

[57] ABSTRACT

An induction system of the invention is adapted to apply coordinate transformation to the excitation current reference vector corresponding to the primary interlinkage magnetic flux vector reference value and the primary current vector so that they exist in the same coordinate system, thereafter to control the secondary current vector so that the primary interlinkage magnetic flux vector is in correspondence with the primary interlinkage magnetic flux vector, thereby allowing the primary side of the wound-rotor induction machine to function apparently as a voltage source.

6 Claims, 8 Drawing Sheets

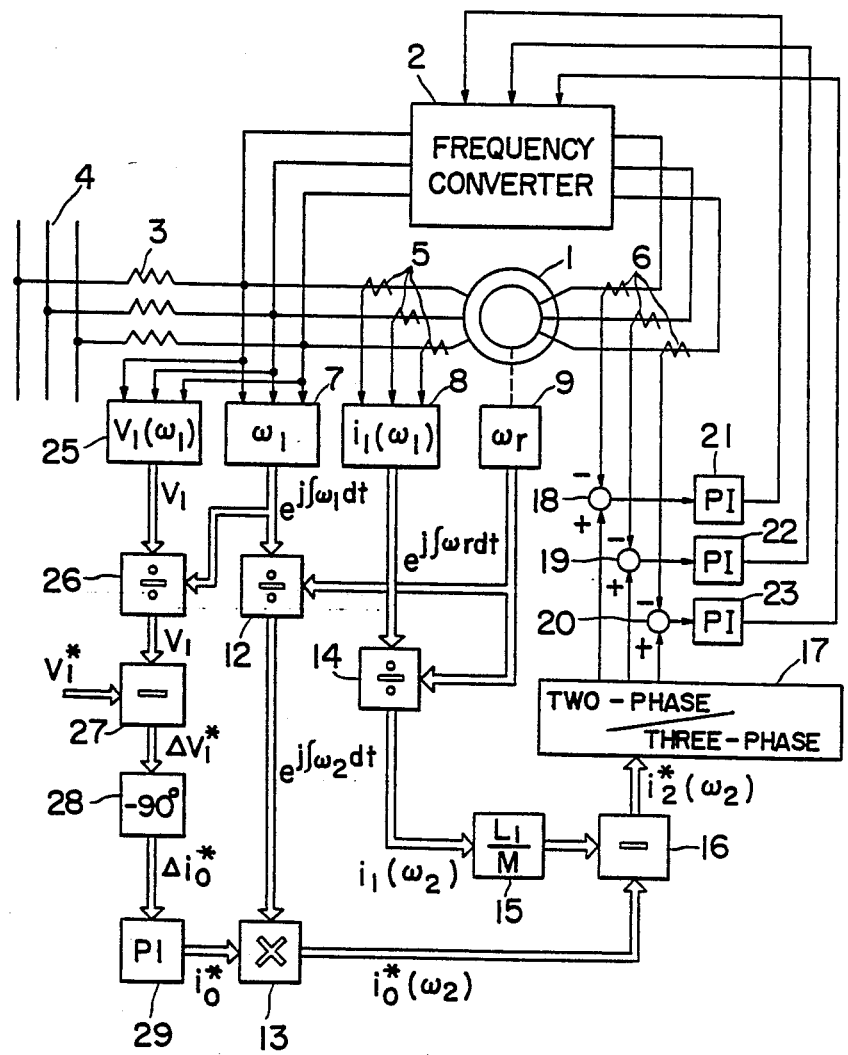
F I G. 11

4,794,316

INDUCTION MACHINE SYSTEM

BACKGROUND OF THE INVENTION

1. Technical Field of the Invention

The present invention relates to an induction machine system including therein a wound-rotor induction machine for controlling the secondary current vector to perform a secondary excitation control.

2. Prior Art

In the wind-power generation, for the purpose of converting a wind energy to an electric energy so that the wind energy becomes maximum with respect to changes of a wind velocity or force, adjustable-speed running corresponding to the wind velocity is conducted. Moreover, in the water-power generation, running is conducted at a rotation speed where the efficiency of a water turbine becomes maximum with respect to changes of water head or changes of the load, thereby making it possible to perform high efficiency running. In addition, in such a case that a generator is directly coupled to the shaft of a propeller of the ship to effect power generation, the adjustable-speed power generation is strongly required. For one of such adjustable-speed generation systems, there is known a system to control the secondary current of the wound-rotor induction machine using a frequency converter to effect a control such that the frequency of the primary side is kept constant even if the rotation speed changes, which is so called the "secondary excitation system". Because this system advantageously permits the capacity of the converter to be reduced, it is especially suitable for large capacity power generation plant.

The voltage control apparatus based on the secondary excitation system of the wound-rotor induction machine of this kind has been already proposed (See FIGS. 3. 2. 11, page 96, research paper BMFT-FB-T84-154(1), by Bundesministerium fuer Forschung und Technologie in West Germany). In this apparatus, the primary winding of the wound-rotor induction machine is connected to the system. The frequency converter comprised of a cycloconverter is connected to the secondary winding, thereby conducting the secondary current control. Namely, three-phase command values of the secondary current are delivered to the frequency converter. These command values are compared with detection values of the secondary current, thus to effect a control such that the detection values are always equal to the command values. In addition, the primary current is detected with it being divided or separated into the current component in phase with the primary voltage and the current component lagging it by a phase angle of 90 degrees. By the product of these detection values and the absolute value of the primary voltages, the effective power on the primary side and the reactive power on the primary side are detected. On the other hand, command values of the effective and reactive powers are given. Then, these command values are compared with respective detection values, whereby the secondary current vector is controlled through the effective power adjuster, the reactive power adjuster and the frequency converter so that the compared deviations are equal to zero.

As just described above, the conventional system has been the system to control the secondary current vector of the wound-rotor induction machine in accordance with the command values of the effective and reactive powers. Accordingly, the primary side of the wound-rotor induction machine apparently serves as a current source, so that the primary voltage follows the changes of the system voltage. For this reason, in the event that the system voltage is disturbed due to the system trouble, the conventional system lacks the ability of maintaining the system voltage constant. Particularly, in such a case that one line is cut off due to the one line grounding trouble and is opened, there was an inconvenience such that the primary voltage is greatly distorted because of the configuration of the control system, so that commutation failure happens in the cycloconverter constituting the frequency converter, or an overvoltage occurs. Accordingly, the conventional system has found limited use of extremely small capacity power generation plants subsidiary to the system, which only impregnate a generated power into the system. Therefore, the conventional system was not applicable to the large capacity power plants having the duty to maintain the system voltage.

SUMMARY OF THE INVENTION

A principal object of the present invention is to provide a wound-rotor induction system having a function of allowing the primary side of the wound-rotor induction machine operating as a generator to apparently serve as a voltage source.

Another object of the present invention is to provide a wound-rotor induction system capable of continuing the power generation in a stabilized manner even at the time of the trouble of the power transmission line or the trouble of the system.

A further object of the present invention is to provide a wound-rotor induction system capable of controlling the primary voltage vector with a high accuracy.

A still further object of the present invetion is to provide a wound-rotor induction system capable of reducing the distortion of the primary voltage.

To achieve these objects, the wound-rotor induction system according to the present invention is implemented to apply coordinate transformation to an excitation current reference vector corresponding to a primary interlinkage magnetic flux vector reference value and a primary current vector so that they exist in the same coordinate system, thereafter to control a secondary current vector so that a primary linkage magnetic flux vector is in correspondence with the primary interlinkage magnetic flux vector reference value, thereby allowing the primary side of the wound-rotor induction machine to apparently serve as a voltage source.

BRIEF DESCRIPTION OF THE DRAWINGS

In the drawings:

FIG. 11 is a block diagram showing a third embodiment of a wound-rotor induction system according to the present invention;

DETAILED DESCRIPTION OF THE INVENTION

Figure 1:
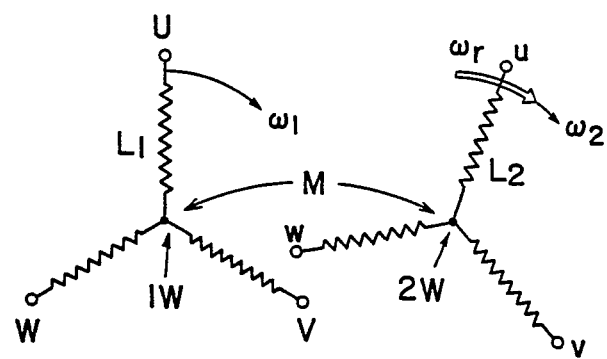
FIG. 1 is a schematic view for explaining the function of the wound-rotor induction machine.

FIG. 1 is a schematic diagram for explaining the function of a wound-rotor induction machine. In this figure, 1W and 2W denote primary and secondary windings, respectively. It is assumed that a primary current vector produced by the current flowing in the U-, V- and W-phases of the primary winding is designated by $i_1$, and a secondary current vector produced by the current flowing in the u-, v- and w-phases of the secondary winding is designated by $i_2$. It is further assumed that self-inductances of the primary and the secondary winding 1W and 2W are respectively represented with $L_1$ and $L_2$, a mutual inductance between the primary and secondary windings 1W and 2W is represented with $M$, angular frequencies on the primary and secondary sides are respectively represented with $\omega_1$ and $\omega_2$, and a rotational angular frequency of the secondary winding 2W (rotor) is represented with $\omega_r$. These angular frequencies have a relationship expressed by the following equation:

$$\omega_1 = \omega_r + \omega_2 \qquad (1).$$

Figure 2:
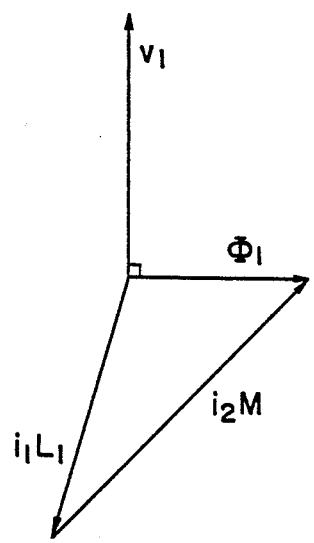
FIG. 2 is a fundamental vector diagram of the wound-rotor induction machine.

FIG. 2 is a vector diagram showing the relationship which holds in connection with primary and secondary current vectors $i_1$ and $i_2$ and the primary voltage vector $v_1$. The primary interlinkage magnetic flux vector $\Phi_1$ interlinking with the primary winding 1W is expressed by the following equation:

$$\Phi_1 = i_1 L_1 + i_2 M \qquad (2).$$

The primary voltage vector $v_1$ is expressed as follows:

$$v_1 = (d/dt)\Phi_1 \qquad (3).$$

Accordingly, for controlling the primary voltage vector $v_1$, it is seen that it is sufficient to control the primary interlinkage magnetic flux vector $\Phi_1$.

Then, the relational equation of how to control the secondary current vector $i_2$ for controlling the primary interlinkage magnetic flux vector $\Phi_1$ will be derived. From the equation (2), the secondary current vector $i_2$ is expressed as follows:

$$i_2 = (\Phi_1/M) - (L_1/M)i_1 \qquad (4).$$

Assuming that command values of the secondary current vector and the secondary interlinkage magnetic flux vector are respectively represented with $i_2^*$ and $\Phi_1^*$, when $i_2$ and $\Phi_1$ in the equation (4) are respectively replaced by $i_2^*$ and $\Phi_1^*$, the following relationship holds:

$$i_2^* = (\Phi_1^*/M) - (L_1/M)i_1 \qquad (5).$$

When it is assumed that control is effected so that $i_2$ always becomes equal to $i_2^*$, the following relationship holds:

$$i_2 \approx i_2^* \qquad (6).$$

From the above equations (4), (5) and (6), the right side of the equation (4) is expressed as follows:

$$(\Phi_1/M) - (L_1/M)i_1 \approx (\Phi_1^*/M) - (L_1/M)i_1 \qquad (7).$$

From the equation (7), the following relationship holds:

$$\Phi_1 \approx \Phi_1^* \qquad (8).$$

Figure 3:
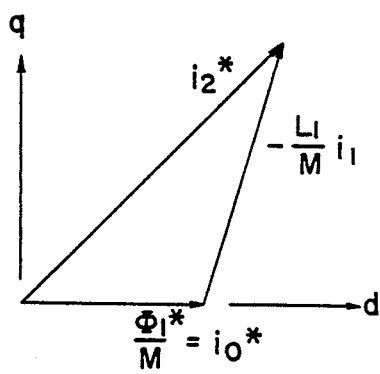
FIG. 3 is a fundamental vector diagram for explaining the principle for control of the primary interlinkage magnetic flux vector of the wound-rotor induction machine.

Accordingly, when the command value $\Phi_1^*$ of the primary interlinkage magnetic flux vector is given, by obtaining the command value $i_2^*$ of the secondary current vector using the equation (5) to control the secondary current vector $i_2$ with the command value $i_2^*$ being as reference, it is possible to effect a control such that the primary interlinkage magnetic flux vector $\Phi_1$ always becomes equal to the command value $\Phi_1^*$. The equation (5) is indicated by the vector diagram of FIG. 3.

First Embodiment

An embodiment in which the primary interlinkage magnetic flux vector $\Phi_1$ is controlled for functioning the wound-rotor induction machine 1 as a voltage source in accordance with the equations stated above will be explained with reference to FIG. 4. It is to be noted that when the secondary current vector command value $i_2^*$ is obtained using the equation (5), it is required to apply coordinate transformation to the primary interlinkage magnetic flux command value $\Phi_1^*$ and the primary current vector $i_1$ so that they exist in the same coordinate system. In this embodiment, an explanation will be made in connection with the case of applying coordinate transformation to both values so that they exist in the coordinate system on the secondary side of the wound-rotor induction machine 1. For the coordinate system, there is employed a Cartesian or rectangular coordinate system such that the direction of the magnetic flux axis is assumed as d-axis and the axis leading the d-axis by a phase angle of 90 degrees is assumed as q-axis. For performing transformation of the coordinate system, it is required to obtain the angular frequency $\omega_1$ on the primary side and the rotational angular frequency $\omega_r$ of the secondary winding.

Figure 4:
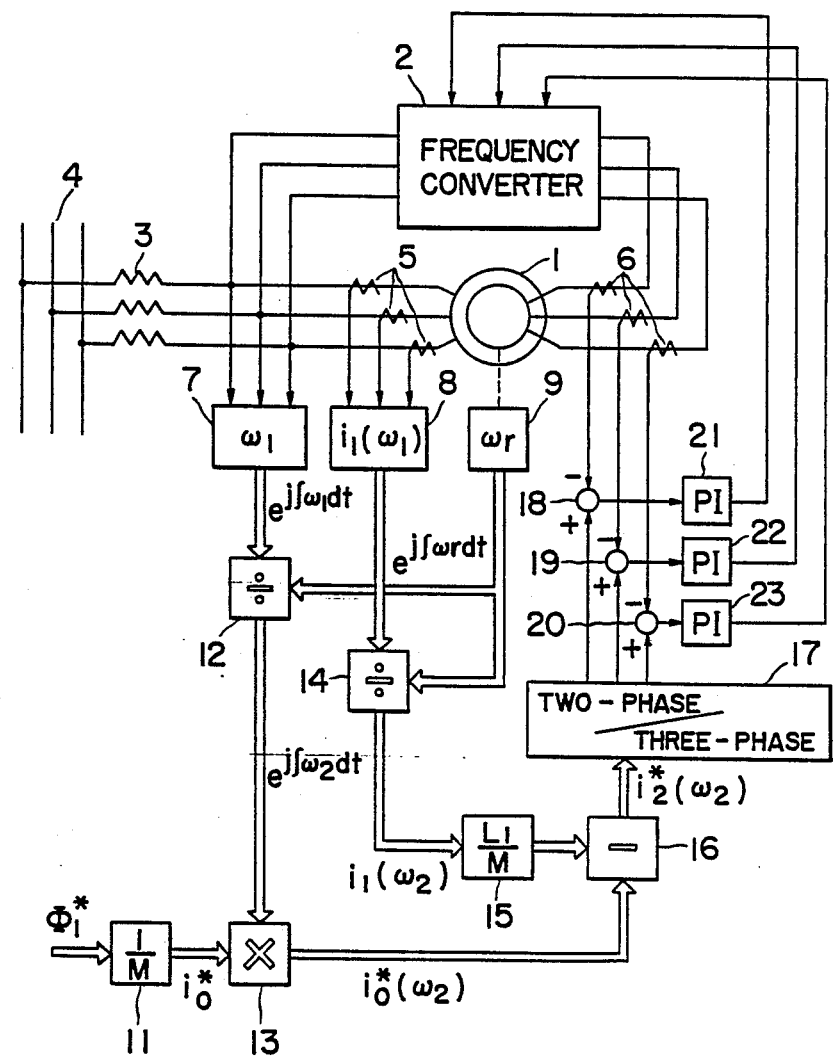
FIG. 4 is a block diagram showing an embodiment of a wound-rotor induction system according to the present invention.

In FIG. 4, the power circuit comprises the wound-rotor induction machine 1, a frequency converter 2, a transmission line 3, and a system bus 4. The primary winding terminal of the wound-rotor induction machine 1 is connected to the system bus 4 through the transmission line 3, and is also connected to the secondary winding terminal of the wound-rotor induction machine 1 through the frequency converter 2 (e.g., comprised of a cycloconverter).

For detecting the primary current of the wound-rotor induction machine 1, a primary current detector 5 is provided. For detecting the secondary current thereof, a secondary current detector 6 is provided. For detecting the angular frequency $\omega_1$ of the primary voltage, an angular frequency detector 7 is provided. In addition, for detecting the rotational angular frequency $\omega_r$ of the rotor, a rotational angular frequency detector 9 is provided.

Figure 5:
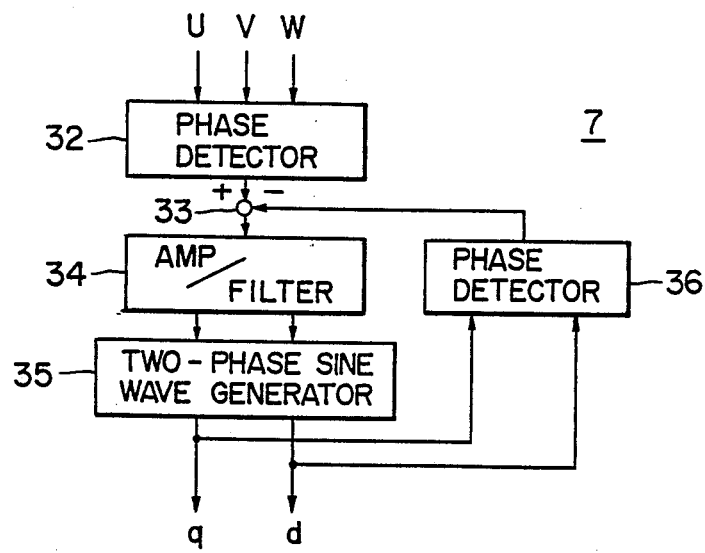
FIG. 5 is a block diagram showing an example of the circuit configuration of an angular frequency detector.

The angular frequency detector 7 may be constituted with, e.g., a phase locked loop as shown in FIG. 5. The device shown in FIG. 5 comprises a phase detector 32 for detecting the phase of the primary side voltage of the wound-rotor induction machine 1, a subtracter 33, an amplifier and filter 34, a two-phase sine wave generator 35, and a phase detector 36 for detecting the phase of the output voltage of the two-phase sine wave generator 35. In this device, output signals of the both phase detectors 32 and 36 are introduced into the subtracter 33 so that the phase of the primary side voltage detected by the phase detector 32 and the phase of the two-phase sine wave detected by the phase detector 36 are always equal to each other, whereby the output frequency of the two-phase sine wave generator 35 is controlled so that the difference therebetween, i.e., the phase deviation becomes equal to zero.

With the configuration stated above, two-phase signals expressed by the following equations are obtained as the output of the angular frequency detector 7:

$$q\omega_1 = \cos(\omega_1 t) \qquad (9), \text{ and}$$

$$d\omega_1 = \sin(\omega_1 t) \qquad (10).$$

The rotational angular frequency $\omega_r$ of the secondary winding is detected by the rotational angular frequency detector 9. Thus, two-phase signals expressed by the following equations are obtained:

$$q\omega_r = \cos(\omega_r t) \qquad (11), \text{ and}$$

$$d\omega_r = \sin(\omega_r t) \qquad (12).$$

A vector divider 12 performs the computation expressed by the following equations using the output of the angular frequency detector 7 and the output of the rotational frequency detector 9:

$$\begin{aligned} q\omega_2 &= q\omega_1 x q\omega_r + d\omega_1 x d\omega_r \\ &= \cos(\omega_1 t)\cos(\omega_r t) + \sin(\omega_1 t)\sin(\omega_r t) \\ &= \cos(\omega_1 t - \omega_r t) = \cos(\omega_2 t), \end{aligned} \qquad (13)$$

and $$\begin{aligned} d\omega_2 &= d\omega_1 x q\omega_r + q\omega_1 x d\omega_r \\ &= \sin(\omega_1 t)\cos(\omega_r t) - \cos(\omega_1 t)\sin(\omega_r t) \\ &= \sin(\omega_1 t - \omega_r t) = \sin(\omega_2 t). \end{aligned} \qquad (14)$$

Figures 6, 7:
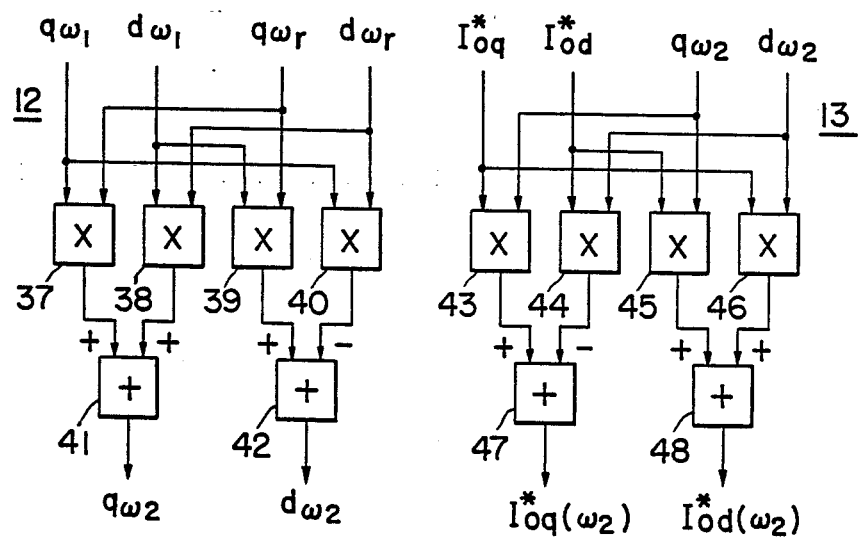
FIG. 6 is a block diagram showing an example of the circuit configuration of a vector divider.
FIG. 7 is a block diagram showing an example of the circuit configuration of a vector multiplier.

FIG. 6 shows an example of the actual configuration of the vector divider 12 for performing the computation of the above equations (13) and (14). The configuration shown in this figure includes multipliers 37 to 40, and adders 41 and 42 wherein these circuit components are arranged so as to realize the computation expressed by the above equations (13) and (14).

On the other hand, the primary current vector $i_1$ of the wound-rotor induction machine 1 is detected by the detector 8. Thus, two-phase signals expressed by the following equations are obtained as its output:

$$I_{1q}(\omega_1) = I_1 \cos(\omega_1 t + \theta_1) \qquad (15),$$

and $$I_{1d}(\omega_1) = I_1 \sin(\omega_1 t + \theta_1) \qquad (16),$$

where $I_1$ denotes an amplitude of the primary current vector $i_1$ and $\theta_1$ denotes a phase angle of the primary current vector with respect to the q-axis.

Then, outputs of the vectors 8 and 9 are input to a vector divider 14 to perform the computation expressed by the following equations:

$$\begin{aligned} I_{1q}(\omega_2) &= I_{1q}(\omega_1) x q\omega_r + I_{1d}(\omega_1) x d\omega_r \\ &= I_1 \cos(\omega_1 t + \theta_1)\cos(\omega_r t) + \\ &\quad I_1 \sin(\omega_1 t + \theta_1)\sin(\omega_r t) \\ &= I_1 \cos(\omega_1 t - \omega_r t + \theta_1) \\ &= I_1 \cos(\omega_2 t + \theta_1), \end{aligned} \qquad (17)$$

and $$\begin{aligned} I_{1d}(\omega_2) &= I_{1d}(\omega_1) x q\omega_r + I_{1q}(\omega_1) x d\omega_r \\ &= I_1 \sin(\omega_1 t + \theta_1)\cos(\omega_r t) - \\ &\quad I_1 \cos(\omega_1 t + \theta_1)\sin(\omega_r t) \\ &= I_1 \sin(\omega_1 t - \omega_r t + \theta_1) \\ &= I_1 \sin(\omega_2 t + \theta_1). \end{aligned} \qquad (18)$$

The equations (17) and (18) are similar to the above-mentioned equations (13) and (14) and the computation can be performed using the vector divider of the configuration shown in FIG. 6.

The reference value $\Phi_1^*$ of the primary interlinkage magnetic flux vector is composed of both axial components expressed by the following equations:

$$\Phi_{1q}^* = -\Phi_1 \sin\theta_0 \qquad (19),$$

and $$\Phi_{1d}^* = \Phi_1^* \cos\theta_0 \qquad (20),$$

where $\theta_0$ denotes a phase angle of the primary interlinkage magnetic flux vector with respect to the d-axis. This reference value is multiplied by $1/M$ at the coefficient multiplier 11. In this instance, since M represents the mutual inductance between the primary and secondary windings, the output of the coefficient multiplier 11 is expressed by the following equations:

$$\begin{aligned} \Phi_{1q}^*/M &= -(\Phi_1^*/M)\sin\theta_0 \\ &= -I_0^* \sin\theta_0 = I_{0q}^*, \end{aligned} \qquad (21)$$

and $$\begin{aligned} \Phi_{1d}^*/M &= (\Phi_1^*/M)\cos\theta_0 \\ &= I_0^* \sin\theta_0 = I_{0q}^* \end{aligned} \qquad (22)$$

where $I_0^*$ denotes an amplitude of the excitation current reference vector and $\theta_0$ denotes a phase angle thereof with respect to the d-axis. by inputting the signals expressed by the equations (21) and (22) from the coefficient multiplier 11 and the output of the vector divider 12, i.e., the signals expressed by the equations (13) and (14) to the vector divider 13, the following computation expressed by the following equations is performed:

$$I_{0q}^*(\omega_2) = I_{0q}^* x q\omega_2 - I_{0d}^* x d\omega_2 \quad (23)$$
$$= -I_0^* \sin\theta_0 \cos(\omega_2 t) - I_0^* \cos\theta_0 \sin(\omega_2 t)$$
$$= -I_0^* \sin(\omega_2 t + \theta_0),$$

and $$I_{0d}^*(\omega_2) = I_{0q}^* x d\omega_2 + I_{0d}^* x q\omega_2 \quad (24)$$
$$= -I_0^* \sin\theta_0 \sin(\omega_2 t) - I_0^* \cos\theta_0 \cos(\omega_2 t)$$
$$= I_0^* \cos(\omega_2 t + \theta_0).$$

The computation expressed by the above equations (23) and (24) may be performed using a vector multiplier 13 shown in FIG. 7. This vector multiplier includes multiplier 43 to 46 and adders 47 and 48.

Thus, the primary current vector $i_1$ which has been subjected to coordinate transformation so that it exists in the coordinate system on the secondary side is obtained at the output side of the vector divider 14 and the excitation current reference vector $i_0^*$ which has been subjected to coordinate transformation so that it exists in the coordinate system on the secondary side is obtained at the output side of the vector multiplier 13. These signals are introduced into a coefficient multipler 15 and a vector subtracter 16 to effect computation using the configuration shown in FIG. 8. this circuit configuration includes coefficient multipliers 49 and 50 for multiplication of the coefficient of $L_1/M$, each corresponding to the coefficient multiplier 15 shown in FIG. 4, and adders 51 and 52 each corresponding to the vector subtracter 16 shown in FIG. 4.

Figure 8:
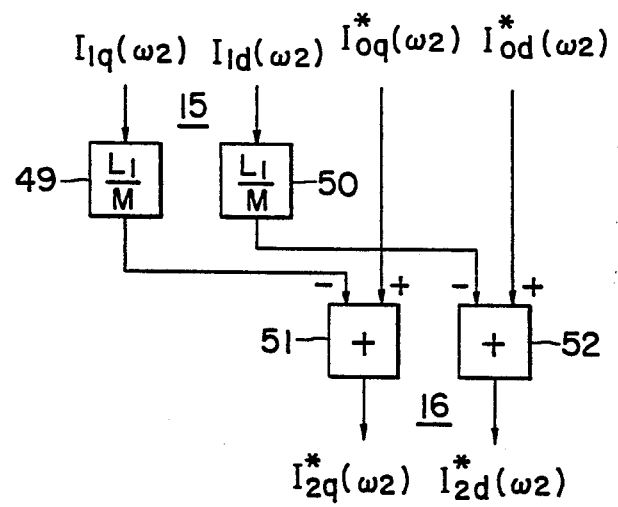
FIG. 8 is a block diagram showing an example of the circuit configuration of a coefficient multiplier and a vector subtracter.

The computation expressed by the following equations is performed using the computing circuit shown in FIG. 8:

$$I_{2q}^*(\omega_2) = I_{0q}^*(\omega_2) - (L_1/M)I_{1q}(\omega_2) \quad (25)$$
$$= -I_0^* \sin(\omega_2 t + \theta_0) -$$
$$(L_1/M)I_1 \cos(\omega_2 t + \theta_1),$$

and $$I_{2d}^*(\omega_2) = I_{0d}^*(\omega_2) - (L_1/M)I_{1d}(\omega_2) \quad (26)$$
$$= I_0^* \cos(\omega_2 t + \theta_0) -$$
$$(L_1/M)I_1 \sin(\omega_2 t + \theta_1).$$

Figure 9:
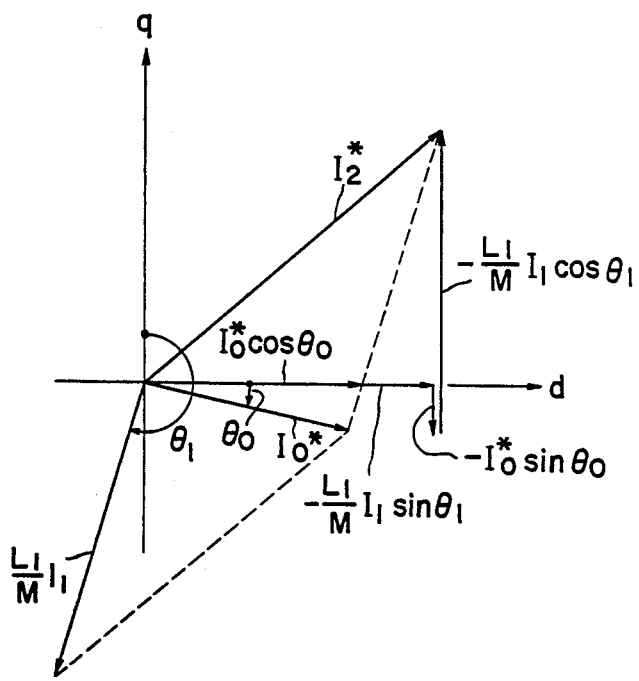
FIG. 9 is a vector diagram for explaining the operation of the appartus shown in FIG. 4.

The equations (25) and (26) are expressed by the vector diagram of FIG. 9 in the coordinate system rotating at the angular frequency $\omega_2$. In this figure, the vector sum of $(L_1/M)I_1$ and $I_2^*$ is equal to $I_0^*$. Accordingly, when the reference value $I_2^*$ of the secondary current $I_2$ is computed using the equations (25) and (26) with respect to the value of an arbitrary primary current $I_1$ to effect a control such that $I_2$ always becomes equal to $I_2^*$, the excitation current $I_0$ is controlled so that it becomes equal to the reference value $I_0^*$.

Thus, the reference value $i_2^*$ of the secondary current vector is obtained as the output of the vector subtracter 16 in the form of the two-phase signals. Accordingly, this reference value $i_2^*$ may be converted to three-phase reference values using a two-phase/three-phase converter 17 to compare them with currents of u-, v- and w-phases on the secondary side of the wound-rotor induction machine 1 detected by the current detector 6 at respective subtracters 18, 19 and 20 to effect a secondary current control through current control circuits 21, 22 and 23 and the frequency converter 2 so that their deviations become equal to zero.

By controlling the excitation current vector in accordandce with the reference value in a manner stated above, it is possible to control the primary interlinkage magnetic flux vector in accordance with the reference value. Accordingly, the secondary current is controlled so that the primary voltage of the wound-rotor induction machine 1 is always kept constant with respect to the change of the load or the like. Thus, the induction machine 1 is controlled so that it serves apparently as a voltage source. Particularly in the case that the load is unbalanced or one line is opened, an antiphase or negative-phase current would flow into the primary side. However, assuming that the response of the secondary current control system is sufficiently fast, control operation is performed so that the magnetomotive force based on the antiphase current from the primary side is cancelled with the secondary current to remove the influence of the magnetomotive force on the excitation current. Thus, the distortion of the primary voltage based on the antiphase current is suppressed, thus making it possible to conduct running with a good characteristic.

It has been described that the reference value of the primary interlinkage magnetic flux vector and the primary current vector are subjected to coordinate transformation so that they exist in the coordinate system on the secondary side to effect a control. The gist of the present invention resides in that the secondary current vector is controlled on the basis of the difference vector between the excitation current reference vector corresponding to the reference value of the primary interlinkage magnetic flux vector and the primary current vector. Accordingly, there may be employed a method to obtain the difference vector in an arbitrary coordinate system except for the above to effect the above-mentioned control.

Second Embodiment

Figure 10:
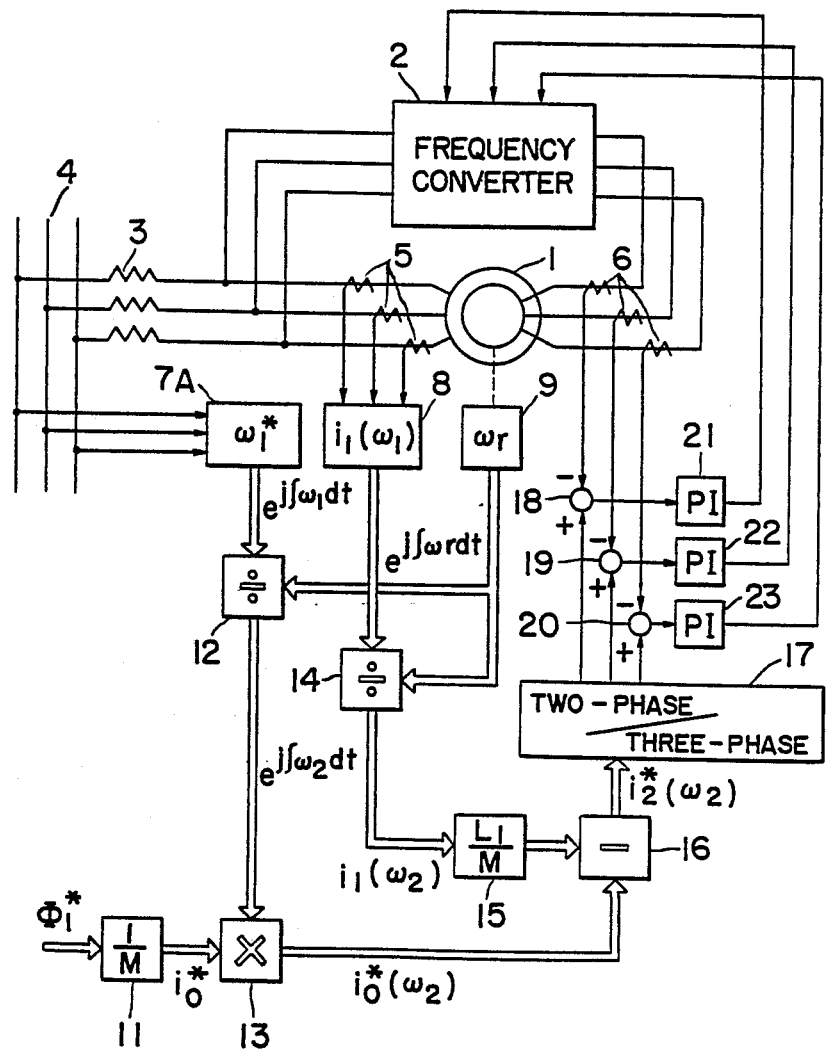
FIG. 10 is a block diagram showing a second embodiment of a wound-rotor induction system according to the present invention.

FIG. 10 shows an embodiment adapted for causing the primary side of the wound-rotor induction machine to function apparently as a voltage source and for making it possible to stably continue power generation still at the time of trouble of the transmission line or trouble of the system. In this embodiment, in place of the angular frequency detector 7 shown in FIG. 4, a system angular frequency reference value generator 7A is provided. Other circuit components are the same as those in FIG. 4. The system angular frequency reference value generator 7A functions to generate a system angular frequency reference value $\omega_1^*$ on the primary side of the wound-rotor induction machine 1 on the basis of the angular frequency of the system bus 4. A generator constituted with, e.g. a phase locked loop as shown in FIG. 5 may be used for this purpose. The computations carried out in the vector divider 12 and the vector multiplier 13 are substantially the same as those in FIG. 4.

This embodiment is characterized in that the reference of the primary side angular frequency is obtained by using the system angular frequency reference value generator 7A. Accordingly, even in the case that the transmission line 3 undergoes grounding trouble etc., so that the voltage on the input side of the wound-rotor induction machine is disturbed, it is possible to stably maintain the power generation. Particularly, even in the case that the three-phase lines are opened by an interrupter at the output terminal of a power generation plant due to the three-phase trouble etc., it is possible to continue power generation while generating a voltage synchronous with the system at any time. Thus, still when the system is powered again, power transmission can be initiated without disturbing the system. In the case of using the phase locked loop shows in FIG. 5 for the system angular frequency reference value generator, when a setting is made such that the time constant of the filter included in the circuit component 34 is sufficiently large, it is possible to stably control a voltage at the terminal of a power generation plant even at the time of disturbance of the system, thus advantageously permitting the voltage fluctuation of the system to be suppressed.

Third Embodiment

FIG. 11 shows an embodiment adapted for causing the primary side of the wound-rotor induction machine 1 to function apparently as a voltage source and for making it possible to control the primary voltage vector with high efficiency. This embodiment is characterized in that the excitation current reference vector $i_0^*$ is obtained on the basis of the primary side voltage vector of the wound-rotor induction machine 1.

It is now assumed that excitation current reference vectors expressed by the following equations are obtained as the output of a PI control system 29:

$$i_{0q}^* = -I_1^* \sin \theta_0 \qquad (27),$$

and $$I_{0d}^* = I_0^* \cos \theta_0 \qquad (28),$$

where $I_0^*$ denotes an amplitude of the excitation current reference vector and $\theta_0$ denotes a phase angle thereof with respect to the d-axis. These equations (27) and (28) correspond to the output signals of the coefficient multipler 11 having been explained in the embodiment shown in FIG. 4, i.e., the equations (21) and (22).

Figure 12:
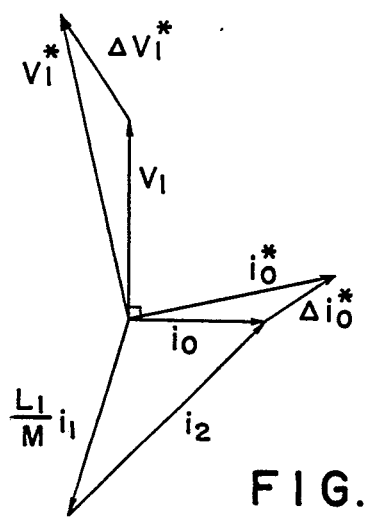
FIG. 12 is a vector diagram for explaining the operation of the system shown in FIG. 11.

FIG. 12 is a vector diagram showing the principle of this embodiment. In this figure, $v_1^*$ is a reference value of the primary voltage vector input to a vector subtracter 27 in FIG. 11. The primary voltage vector $v_1(\omega_1)$ of the wound-rotor induction machine 1 is detected by a primary voltage vector detector 25. The two-phase signal having angular frequency of $\omega_1$ of the primary voltage is obtained as its output. Then, coordinate transformation is conducted by a vector divider 26 using a two-phase unit sine wave having angular frequency of $\omega_1$ to obtain a two-phase signal $v_1$ having angular frequency of zero at its output. The two-phase signal $v_1$ thus obtained is input to a vector subtracter 27 to obtain a vector $\leftarrow v_1^*$ as the difference between the two-phase signal $v_1$ and the reference value $v_1^*$. As seen from FIG. 12, the vectors $i_0^*$, $i_0$ and $\Delta i_0^*$ have a relationship such that they lag vectors $v_1^*$, $v_1$ and $\Delta v_1^*$ by a phase angle of 90 degrees, respectively. Accordingly, the output $\Delta v_1^*$ of the vector subtracter 27 is delayed by a phase angle of 90 degrees using a phase shifter 28 to obtain the difference vector $\Delta i_0^*$, thereafter to amplify it using the PI control system 29, thus to control the excitation current so that the difference vector $\Delta i_0^*$ becomes equal to zero. Thus, it is possible to control the primary voltage vector of the wound-rotor induction machine 1 so that it always becomes equal to its reference value $v_1^*$. The PI control system 29 may be constituted by applying known proportional integration control circuits to d-axis and q-axis components, respectively.

Fourth Embodiment

Figure 13:
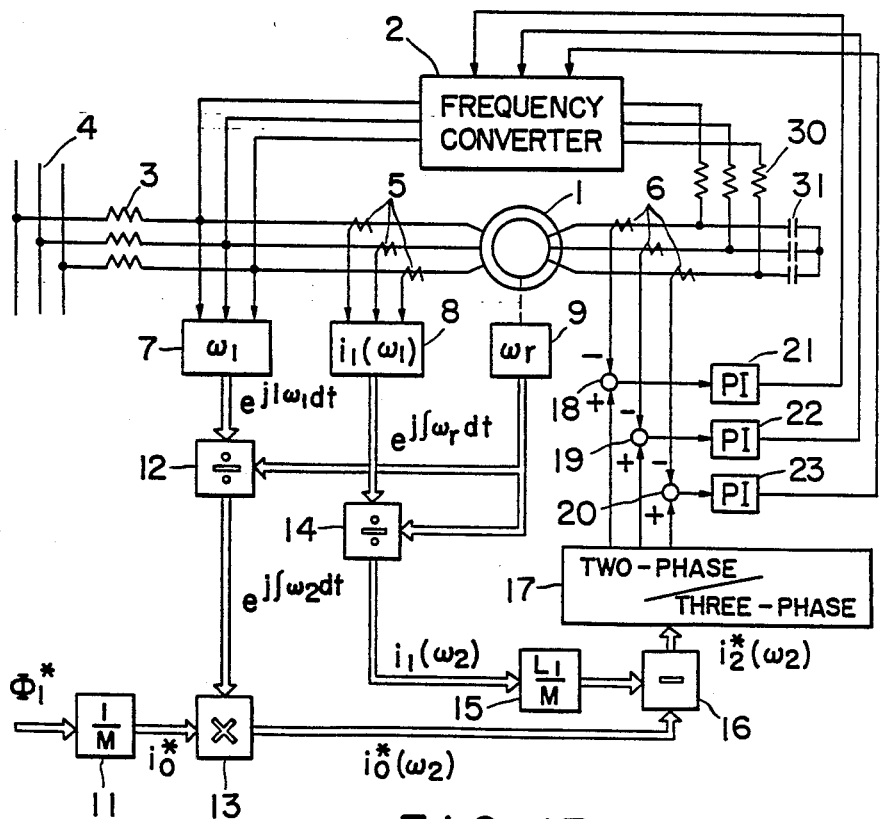
FIG. 13 is a block diagram showing a fourth embodiment of a wound-rotor induction system according to the present invention.

FIG. 13 shows an embodiment adapted for allowing the primary side of the wound-rotor induction machine 1 to function as a voltage source and for permitting the distortion of the primary voltage to be reduced. In this embodiment, there provided reactors 30 connected in series between the secondary terminals of the wound-rotor induction machine 1 and the output terminals of the frequency coverters 2, and capacitors 31 connected in shunt with the secondary terminals of the wound-rotor induction machine 1. Other circuit components are the same as those in FIG. 4.

Figure 14:
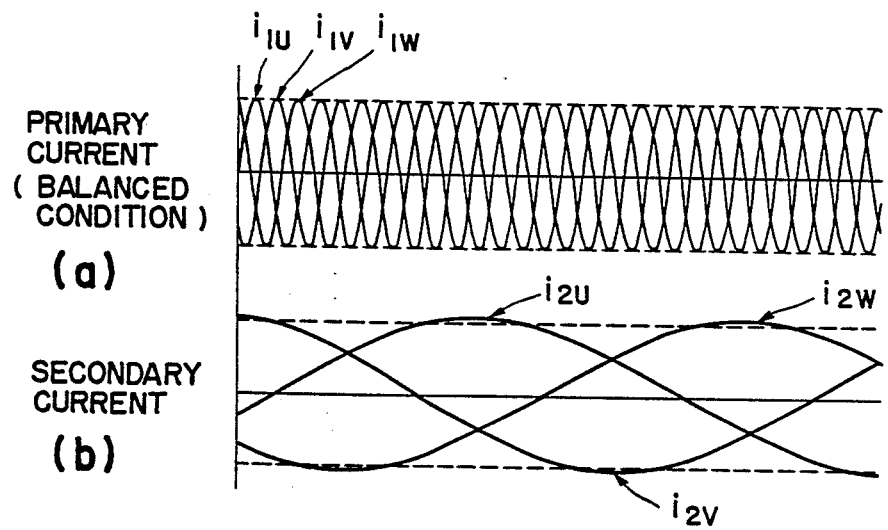
FIGS. 14 and 15 show waveforms of the primary and secondary currents in the balanced and unbalanced conditions of the wound-rotor induction machine.
Figure 15:
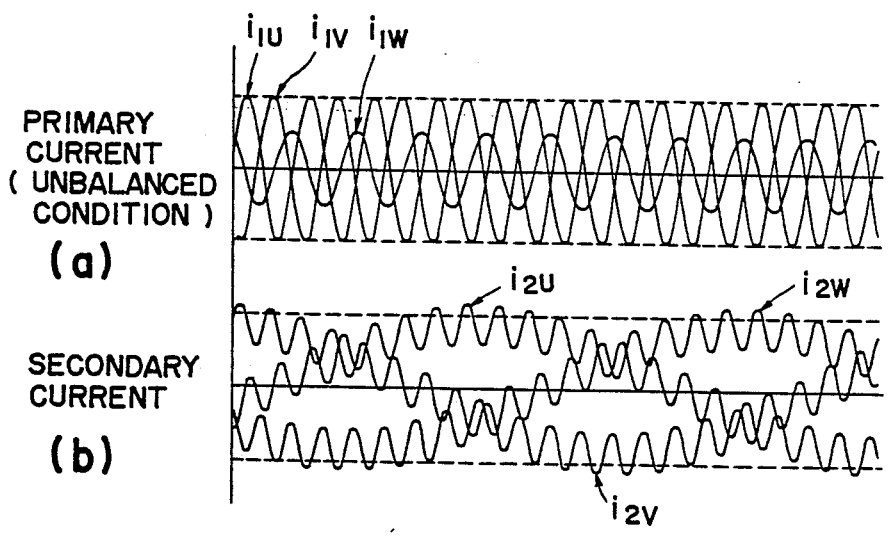

In the case that the load becomes unbalanced or one line is opened, an antiphase current is caused to flow into the primary side of the wound-rotor induction machine 1. For this reason, fast response is required for the secondary current control system. FIGS. 14 and 15 show waveforms of the primary and secondary currents of the wound-rotor induction machine 1. FIG. 14 shows waveforms of primary currents $i_{1u}$, $i_{1v}$ and $i_{1w}$ of respective U-, V- and W-phases when the load is in a balanced condition and secondary currents $i_{2u}$, $i_{2v}$ and $i_{2w}$ corresponding thereto in the case of the running at slip of 8%. When the frequency of the primary current is 50 Hz, the frequency of the secondary current is 4 Hz. FIG. 15 shows waveforms of primary currents of respective U-, V- and W-phases when the load is in an unbalanced condition and secondary currents corresponding thereto. More particularly, FIG. 15 shows waveforms of currents which should be caused to flow on the secondary side, i.e., secondary currents $i_{2u}$, $i_{2v}$ and $i_{2w}$, in order to maintain the excitation current constant and not to produce distortion of the primary voltage. Namely, the term of "the secondary current" in this case means the secondary current required to cancel, from the secondary side, the magnetomotive force based on the antiphase current flowing into from the primary side. When the frequency of the primary side is 50 Hz and the slip is −8%, the frequency of the antiphase component on the secondary side becomes equal to 104 Hz. When the capacity of the wound-rotor induction machine 1 is large, the capacity of the frequency converter 2 is also large, so that there is nothing for it to necessarily use the cycloconverter of the separate excitation system. As well known, the output frequency of the cycloconverter of the separate excitation system is equal to one half to one third of the power supply frequency, with the result that the current control of 104 Hz is essentially impossible. Accordingly, since the magnetomotive force based on the antiphase current flowing into from the primary side cannot be sufficiently cancelled, the primary voltage is distorted to great extent, giving rise to an inconvenience such that commutation failure occurs in the cycloconverter and the system is down. To avoid this, in this embodiment, capacitors 31 are connected to the secondary terminals of the wound-rotor induction machine 1. The electrostatic capacity of the capacitor 31 is selected so that it exhibits a sufficiently low impedance with respect to the antiphase frequency component induced on the basis of the antiphase frequency of the power system. Thus, since most of the antiphase components (components of 104 Hz) in the secondary currents shown in FIG. 15 flow into the capacitors 31, even if the response in the current control of the frequency converter 2 is not so fast, the distortion of the primary voltage based on the antiphase current is sufficiently suppressed, thus making it possible to stably continue running.

It has been described in the above-mentioned embodiments that the wound-rotor induction machine 1 operates as a generator. In addition, the present invetion is applicable to the case that the induction machine 1 operates as a motor.

What is claimed is:

1. An induction machine system comprising:
   a wound-rotor induction machine connected at its primary side to a power system;
   a frequency converter for controlling a secondary current of said wound-rotor induction machine;
   setting means for setting an excitation current reference vector with respect to said wound-rotor induction machine;
   means for detecting a primary current vector of said wound-rotor induction machine;
   coordinate transformation means for applying coordinate transformation to said excitation current reference vector and said primary current vector so that they exist in the same coordinate system;
   means for preparing a secondary current reference vector on the basis of said primary current vector and said excitation current reference vector which have been subjected to the coordinate transformation by said coordinate transformation means;
   means for detecting a secondary current vector of said wound-rotor induction machine; and
   current control means for controlling said frequency converter so that said secondary current vector as in correspondence with said secondary current reference vector.

2. An induction machine system as set forth in claim 1, wherein said setting means comprises means for providing a primary interlinkage magnetic flux vector reference value of said wound-rotor induction machine, and means for transforming said primary interlinkage magnetic flux to said excitation current reference vector.

3. An induction machine system as set forth in claim 1, which further comprises means for detecting a primary voltage angular frequency of said wound-rotor induction machine, and means for detecting a rotational angular frequency of the rotor of said wound-rotor induction machine, whereby said coordinate transformation means applies coordinate transformation to said primary current vector and said excitation current reference vector so that they exist in the same coordinate system on the basis of said primary voltage angular frequency and said rotational angular frequency of said rotor.

4. An induction machine system as set forth in claim 1, which further comprises means for detecting an angular frequency reference value of said power system to which said wound-rotor induction machine is connected, and means for detecting a rotational angular frequency of the rotor of said wound-rotor induction machine, whereby said coordinate transformation means applies said primary current vector and said excitation current reference vector so that they exist in the same coordinate system on the basis of said angular frequency reference value of said power system and said rotational angular frequency of said rotor.

5. An induction machine system as set forth in claim 1, wherein said setting means comprises means for providing a referrence value of a primary voltage vector of said wound-rotor induction machine, means for detecting the primary voltage vector of said wound-rotor induction machine, and means for producing said excitation current reference vector so that a vector indicative of a difference between said reference value of said primary voltage vector and the detection value thereof.

6. An induction machine system as set forth in claim 1, which further comprises a reactor connected in series between an output terminal of said frequency converter and a secondary terminal of said wound-rotor induction machine, and a capacitor connected in shunt with said secondary terminal of said wound-rotor induction machine to exhibit a sufficiently low impedance with respect to an antiphase frequency component induced on the secondary side of said wound-rotor induction machine on the basis of an antiphase frequency of said power system to which said wound-rotor induction machine is connected.

* * * * *